(12) United States Patent
Kay (10) Patent No.: US 6,260,910 B1
(45) Date of Patent: Jul. 17, 2001

(54) CAMPER TIE-DOWN SYSTEM

(75) Inventor: Jack Kay, 315 N. Central, Kent, WA (US) 98032

(73) Assignees: Jack Kay; Anthony Kay, both of Kent, WA (US)

( * ) Notice: Subject to any disclaimer, the term of this patent is extended or adjusted under 35 U.S.C. 154(b) by 0 days.

(21) Appl. No.: 09/422,837

(22) Filed: Oct. 21, 1999

(51) Int. Cl.⁷ .................................................. B60R 15/00
(52) U.S. Cl. ................................................................ 296/167
(58) Field of Search ........................... 296/167, 35.1, 296/35.3

(56) References Cited

U.S. PATENT DOCUMENTS

| | | | |
|---|---|---|---|
| 3,368,785 | * | 2/1968 | Weiler .................................... 296/167 |
| 3,655,234 | * | 4/1972 | Kirschbaum ........................... 296/167 |
| 3,706,469 | * | 12/1972 | Covert .................................... 296/167 |
| 3,719,382 | * | 3/1973 | Palm ....................................... 296/167 |
| 3,782,774 | * | 1/1974 | Sturek .................................... 296/167 |
| 4,630,990 | | 12/1986 | Whiting .................................. 414/462 |
| 5,439,152 | | 8/1995 | Campbell ............................... 224/405 |
| 5,649,656 | | 7/1997 | Davy ...................................... 224/405 |
| 5,836,635 | | 11/1998 | Dorman ..................................... 296/3 |

FOREIGN PATENT DOCUMENTS

961531 * 1/1975 (CA) .................................... 296/167

* cited by examiner

*Primary Examiner*—Joseph D. Pape
(74) *Attorney, Agent, or Firm*—R. Reams Goodloe, Jr.

(57) ABSTRACT

A retractable camper tie-down. The tie down is provided for mounting a load such as a camper to pre-existing mounting structure on a motor vehicle frame. The tie-down includes a retractable base portion, an adjustable tension member, and a shock absorbing cushioning member. The tie-down requires no drilling, cutting, welding or other custom mounting structure for installation on most vehicles.

28 Claims, 5 Drawing Sheets

CAMPER TIE-DOWN SYSTEM

TECHNICAL FIELD

The present invention relates generally to tie downs for attachment of objects to vehicle frames, and more particularly, to tie downs to secure camper bodies to pick-up trucks.

BACKGROUND

Tie-downs for mounting objects on motor vehicle frames are well known. Such tie downs are often provided for fixed installation to the frame, or to the underside of a vehicle (such as a pick-up truck), for securing a load (such as a camper) to the vehicle frame. Generally, four such tie downs are installed on a vehicle for securing the camper to the pick-up truck's bed at or near all four corners. The currently used tie downs known to me generally include a cantilevered telescoping arm projecting horizontally from a secure position on the vehicle frame. Such prior art tie downs include a rigid support member projecting perpendicularly from an outer sleeve of a cantilevered telescoping arm to fixedly attach to a point on the underside of the vehicle to brace the tie down when the load is secured. Also, such tie downs include a chain having one end pliantly attached to the end of the telescoping arm opposite the frame mount and the other end free for fixedly attaching to the load, such as a camper, to secure it to the vehicle. The load is secured to the vehicle by tensioning the chain using, for example, a turnbuckle. Thus tensioned, the chain is a rigid member unable to relieve sudden loads, such as those caused by shifting of the camper relative to the truck bed. Such sudden load, when not relieved, may exceed the stress-bearing capabilities of the joints mounting the tie downs to the vehicle and may loosen the joints and/or damage either or both of the vehicle and the tie downs. While a spring-loaded turnbuckle is known, it is a separate assembly from the tie down and forms no part of the tie down.

It is a drawback that the currently utilized tie downs must be professionally installed by qualified mechanics, primarily since they are provided from the factory in a single embodiment or configuration which requires drilling of additional mounting holes in the vehicle frame. The drilling of such holes in or adjacent to highly loaded or specially hardened steel frame members requires equipment and a skill level ordinarily available only to the professional installer. Furthermore, the warranties provided by many vehicle manufacturers might be violated or voided by the addition of such holes in the vehicle frame members. Therefore, such considerations severely limit the practical application of the known tie downs, as well as effectively prevent their distribution by mail order.

Undesirably, many tie downs also interfere with use of the vehicle even when the load is not present. This is because rigid support members projecting perpendicularly from the outer sleeve of the cantilevered telescoping arm places the tie down in a position beneath the vehicle in a manner that may interfere with steps, bars and other platforms attached to many vehicles for ease of entry and exit. Fixed position tie downs may also interfere with use of the vehicle off-road, because they are positioned below the vehicle, near the ground, and may encounter brush, stumps, rocks and other low lying obstacles.

SUMMARY

The present invention overcomes limitations of prior art tie-downs by providing a retractable tie down for mounting to pre-existing mounting structure on a vehicle frame. The present invention thus overcomes the inherent need (found in the prior art devices) to drill, cut, weld or otherwise provide custom mounting structure for a universal, one-size-fits-all vehicle tie down.

According to one aspect of the invention, the present invention provides first and second spaced apart, mutually perpendicular frame brackets, each frame bracket adapted for mating with pre-existing mounting holes or other structure on a vehicle frame. Generally, the first frame bracket is mounted to a vertical portion of the frame while the second frame bracket is mounted to a horizontal portion of the vehicle frame, i.e., the bottom of the vehicle. The retractable nature of the tie down is provided by a telescoping arm pivotally mounted to a first frame bracket, whereby the telescoping arm is able to rotate relative to the first frame bracket. The telescoping arm includes an outer sleeve, one end of which is rotatably suspended by a pivot mechanism from a face of the first mounting bracket, an inner arm nested in the outer sleeve and able to move axially relative to the outer sleeve, and a releasable clamp which secures the inner arm in fixed axial relationship with the outer sleeve.

According to another aspect of the invention, a support strut extending between the telescoping arm and the second frame bracket secures the telescoping arm in a fixed orientation with each of the first and second frame brackets.

According to another aspect of the invention, the telescoping arm includes a movable slide having a clamp for securing the slide in variable positions along the body of the telescoping arm's outer sleeve. The movable slide includes a second pivot mechanism projecting, to which one end of the support strut extending between the telescoping arm and the second frame bracket is pivotally mounted. The second or horizontally mounted frame bracket includes yet another pivot mechanism to which the other end of the support strut is mounted. Thus, one end of the support strut rotates about the pivot mechanism on the second frame bracket and the other end rotates about the pivot mechanism on the movable slide, while the slide moves along the longitudinal axis of the telescoping arm in order to allow the telescoping arm to rotate up and down relative to the first frame bracket, and thus into different angular orientations with respect to the vehicle frame.

According to still another aspect of the invention, the support strut is configured as a second telescoping arm and includes its own mechanism for locking its inner arm relative to its outer sleeve.

BRIEF DESCRIPTION OF THE DRAWING

In the various figures, like numerals indicate like elements, and may be used without additional discussion thereof.

DETAILED DESCRIPTION

Figure 1:
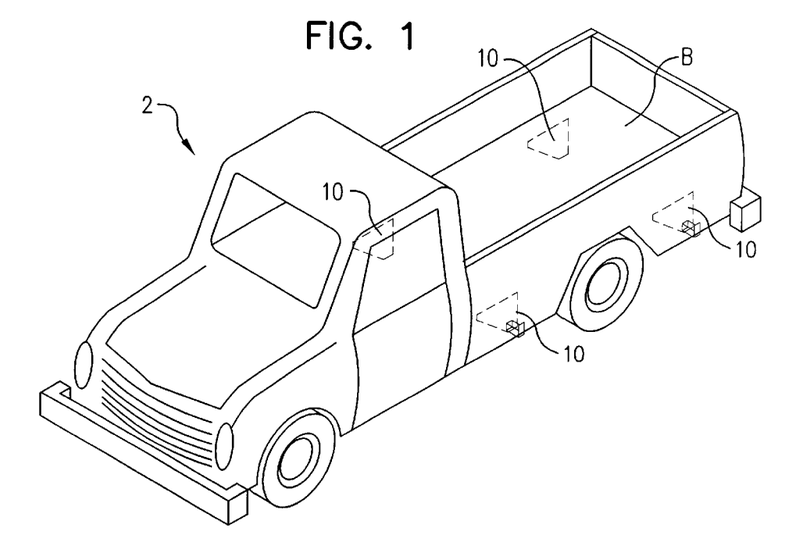
FIG. 1 illustrates a pictorial isometric view of an unmodified vehicle, for example a pick-up truck, having four retractable frame mounted tie downs of the invention installed thereon.

FIG. 1 is a pictorial isometric view of an unmodified vehicle 2, for example a pick-up truck, having four retractable frame mounted tie downs 10 of the type taught herein installed thereon. In FIG. 1, four retractable frame mounted tie downs are shown in the retracted configuration. The four retractable frame mounted tie downs 10 are shown in phantom lines indicating that, in the retracted configuration, the tie downs 10 lie entirely beneath the vehicle such that they do not interfere with use of the vehicle when a load to be tied down is not present. In the retracted configuration, the retractable frame mounted tie downs 10 do not interfere with steps, bars and other platforms attached to many vehicles 2 for ease of entry and exit. In the retracted configuration, the retractable frame mounted tie downs 10 also do not interfere with use of the vehicle off-road because the tie downs 10 are positioned on a vehicle 2 frame portion and are retracted, preferably within the vehicle 2 wheelbase tread dimension such that brush, stumps, rocks and other low lying obstacles are not encountered by the tie downs 10.

Figure 2:
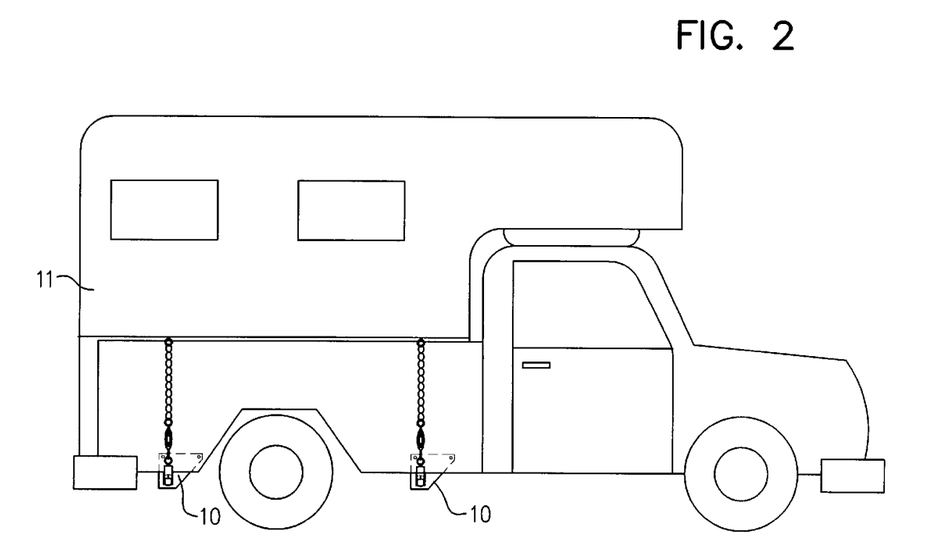
FIG. 2 shows a side view of the vehicle of FIG. 1 with a camper installed in the pick-up bed and the retractable frame mounted tie downs of the invention extended to secure the camper.

FIG. 2 shows a side view of the vehicle 2 with a load, for example a camper 11, installed in the pick-up bed B. In FIG. 2, the retractable frame mounted tie downs 10 are extended to secure the load, i.e. the camper 11. A shock absorber 52 and adjustable tension members 54 (both described in detail below) are used secure a load such as camper 11 to the tie downs 10.

Figure 3:
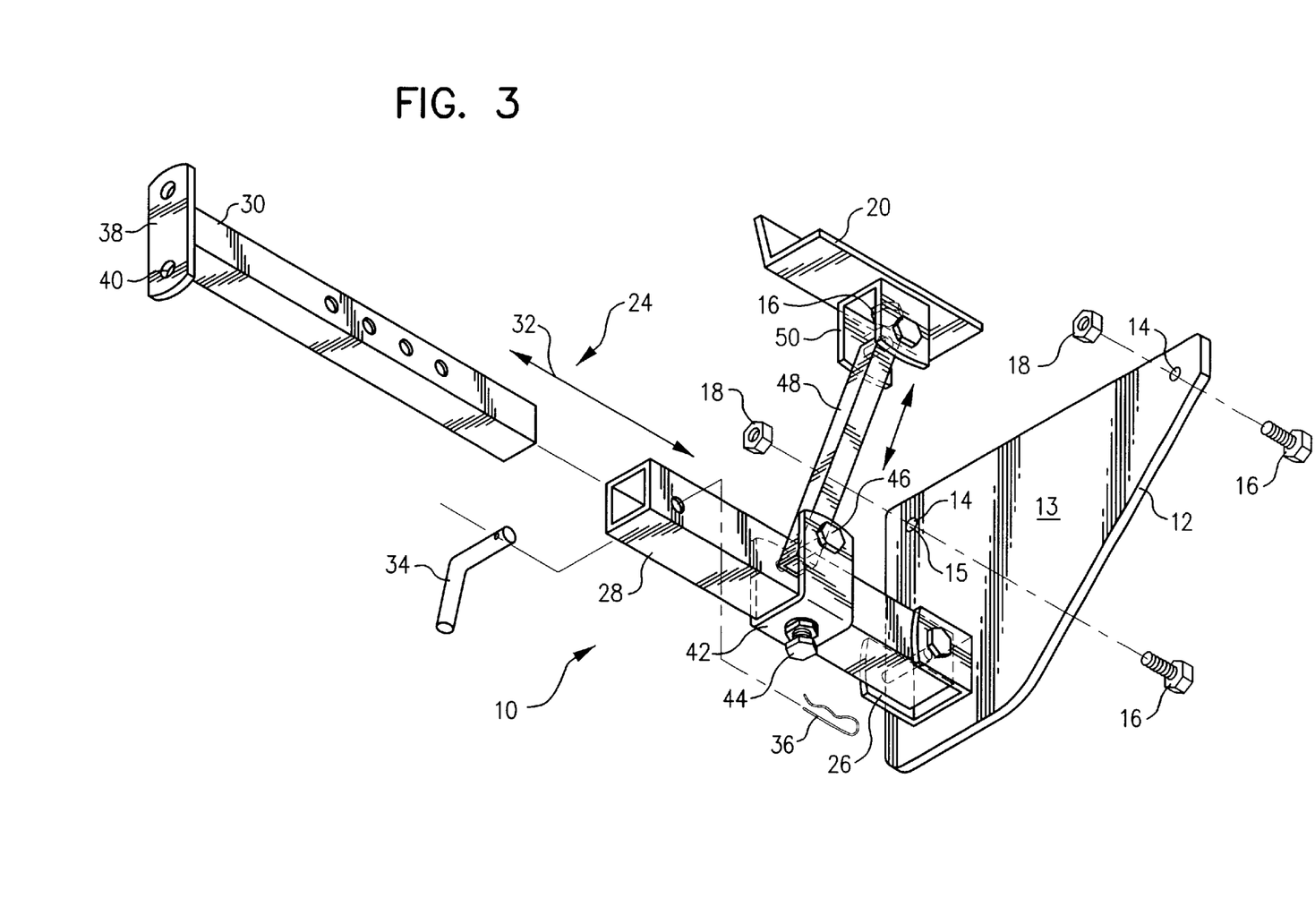
FIG. 3 is an exploded view of one exemplary embodiment of the retractable frame mounted tie downs of the invention.
Figure 4:
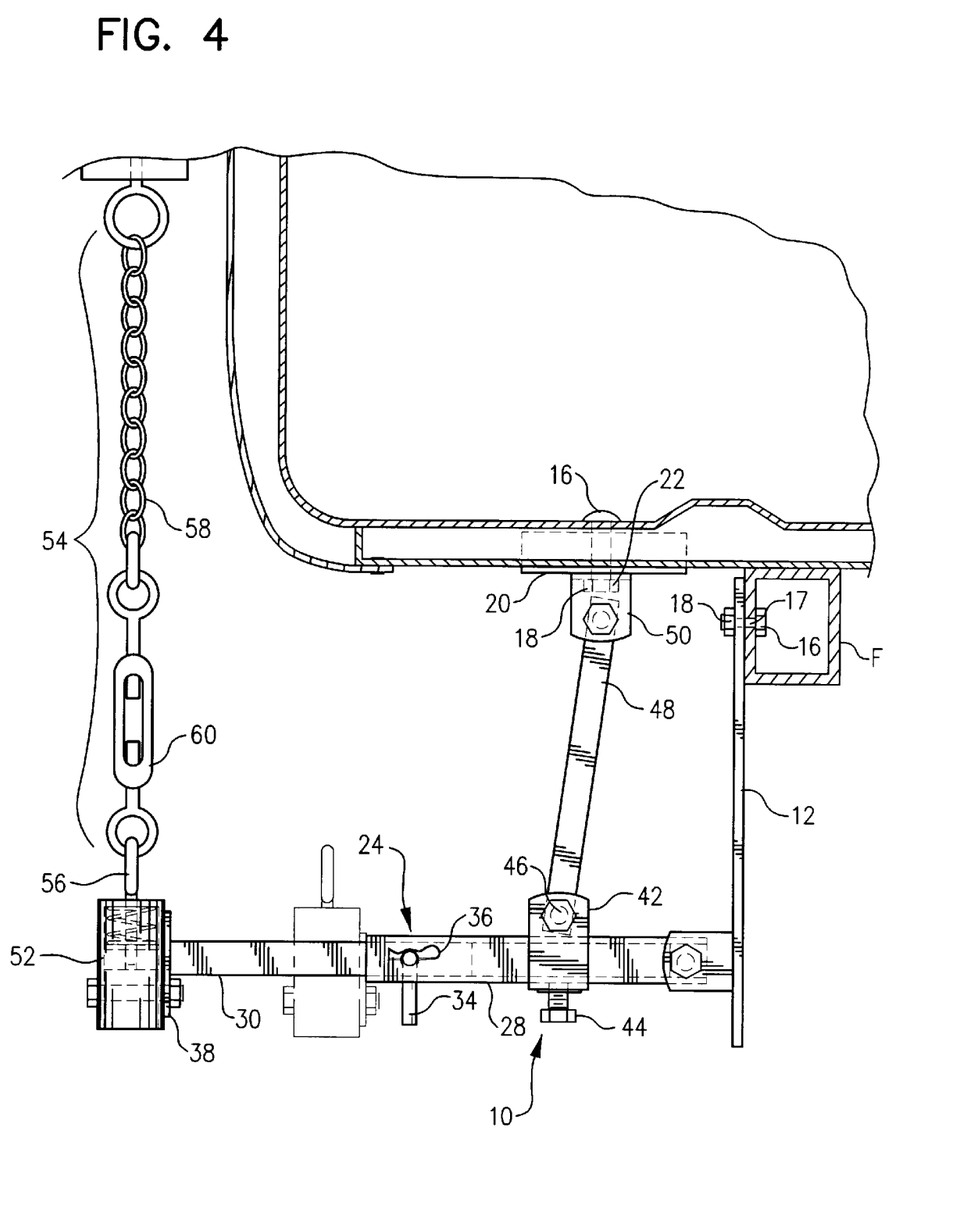
FIG. 4 illustrates the spaced apart, mutually perpendicular relationship of first and second frame brackets of the retractable frame mounted tie downs of the invention as installed on a vehicle frame using fasteners threaded through pre-existing mounting holes on the vehicle frame provided by the original manufacturer such that no drilling of the vehicle frame is needed for installation.

FIG. 3 is an exploded view of one exemplary embodiment of my novel retractable frame mounted tie downs 10. The various details of tie down 10 are preferably formed of a sturdy machinable metal or other material of suitable strength, such as steel, aluminum or another appropriate material. As shown in this exemplary embodiment, a first mounting bracket 12 is configured as an essentially flat metal plate 13 having one or more mounting apertures 14 defined by edgewall portions 15 and positioned to mate with pre-existing mounting apertures 17 on a frame portion F of a pre-selected vehicle 2, as provided by a original equipment manufacturer. Mounts 14 (preferably mounting apertures defined by edge wall portion 15) have dimensions sized complementary to pre-existing matching holes on a pre-selected vehicle. The size and location of mounts 14 vary for particular makes and models of vehicles 2, so that in any application the location of mounts 14 match the size and location of particular pre-existing matching holes 17 located on the frame F of pre-selected vehicle. Mounts 14, when configured as holes, accept bolts 16 previously passed through the pre-existing matching holes 17 in the frame F of a vehicle 2. Nuts 18 are threadingly engage bolts 16 and are tightened to secure first mounting bracket 12 in place against frame of the vehicle 2, as shown in FIG. 4, and as described in further detail below. If the pre-selected vehicle includes pre-existing threaded mounting studs protruding from frame F (as an alternative to pre-existing matching holes formed in the frame), then the mounting studs are provided in place of the illustrated bolts 16, and the mounts 14 in mounting bracket 12 are fitted over such pre-existing studs. Then, nuts 18 are used to secure bracket 12 to the vehicle frame. Mounts 14 may alternatively be provided as threaded studs affixed to one surface of bracket 12, and sized and positioned to mate with the pre-existing matching holes 17 in frame F of the desired vehicle; nuts 18 secure bracket 12 to the vehicle frame. Mounts 14 therefore mate with pre-existing matching holes or other mounting mechanism in the vehicle frame provided by the manufacturer such that installation of bracket 12 requires no modification to the vehicle frame.

A second frame bracket 20 is spaced apart from and oriented perpendicular to first frame bracket 12. While first frame bracket 12 is configured to mount to a vertical portion of the vehicle frame, second frame bracket 20 is configured to mount to a horizontal portion of the vehicle frame, i.e., the bottom of the vehicle, as shown in FIG. 4 and described below. Second frame bracket 20 includes one or more mounts 22 similar in description to mounts 14 of first frame bracket 12. In a preferred configuration, mounts 22 are mounting holes formed in second frame bracket 20 sized and positioned to mate with matching pre-existing mounting holes in the vehicle frame such that second frame bracket 20 is mounted and secured without modification to the vehicle frame. Mounts 22, when configured as holes, accept bolts 16 previously threaded through the pre-existing matching holes on the desired vehicle and nuts 18 (shown in FIG. 4) secure second mounting bracket 20 in place on the vehicle, as shown in FIG. 4 and described in detail below.

A telescoping load bearing arm 24 is rotatably suspended at one end from first frame bracket 12, preferably by a first pivot mechanism 26 fixed to one surface of first frame bracket 12. First pivot mechanism 26 preferably constrains telescoping arm 24 to rotate in a plane essentially perpendicular to the generally planar surface of first frame bracket 12. Telescoping arm 24 includes an outer sleeve 28 that is pinned to first frame bracket 12 at one end by first pivot mechanism 26. Telescoping arm 24 also includes an inner arm portion 30 configured to fit inside outer sleeve 28 with sufficient clearance to move or slide axially relative to outer sleeve 28 as indicated by double-pointed arrow 32. Each of outer sleeve 28 and inner arm 30 are, preferably, configured as commonly available standard square (shown), rectangular or tubular extruded sections. A releasable mechanical arm fastener 34 fixes inner arm 30 in an adjustable axial relationship with outer sleeve 28. Releasable arm fastener 34 is, for example, an "L" pin secured with a security pin 36. However, those of ordinary skill in the art will recognize that many variations of pins and security pins, including clevis pins with cotter pins and even bolts with nuts, may alternatively replace the "L" pin and security pin shown. Also, telescoping arms having a twisting mechanism for fixing the inner arm and outer sleeve in axial relationship to one another are known and contemplated by an alternative embodiment of the present invention. Thus, the invention does not contemplate being limited to the exemplary embodiment shown in the figures and described herein.

Inner arm 30 of telescoping arm 24 includes a mechanism for rotatably mounting a tensioning device, shown in FIG. 4 and described in detail below. For example, according to one embodiment of the invention shown in FIG. 3, inner arm 30 includes a foot 38 mounted at the end projecting from outer sleeve 28. Foot 38 includes a universal mounting mechanism 40, preferably configured as a through hole (shown). Alternatively, foot 38 is a "U" shaped structure and mounting mechanism 40 is a pin or rod extending between the two parallel legs of the "U" shaped structure. Again, those of ordinary skill in the art will recognize that many variations of foot 38 and mounting mechanism 40 are known and contemplated by alternative embodiments of the present invention. Thus, the invention does not contemplate being limited to the exemplary embodiment shown in the figures and described herein.

A slide 42 is movably mounted on outer sleeve 28 of telescoping arm 24. Slide 42 is configured for axial motion along the outer dimension of outer sleeve 28. A clamp 44 fixes slide 42 at variable positions along the longitudinal dimension of outer sleeve 28. According to one embodiment of the invention, slide 42 is an extruded "H" shaped section closed on the bottom by a member extending between the two parallel sides of the "H" section such that the bottom portion of slide 42 is a closed configuration sized to fit around outer sleeve 28 with sufficient clearance to move or slide axially relative to outer sleeve 28 as indicated by double-pointed arrow 32, similar to inner arm 30. Clamp 44 is, for example, a threaded member, commonly referred to as a set bolt or set screw, turned into a mating threaded hole in the closed bottom portion of slide 42 and clamping slide 42 in a variable fixed position along the longitudinal dimension of outer sleeve 28 by a frictional force exerted by the end of threaded clamp 44 against the surface of outer sleeve 28. Slide 42 further includes a second pivot mechanism 46 at the open end of the "H" section extending away from the body of telescoping arm 24 and securing a telescoping support strut 48, described in detail below.

According to another embodiment of the invention, slide 42 is a bent or extruded "U" shaped member secured to outer sleeve 28 of telescoping arm 24 by threaded clamp 44. According to this embodiment, threaded clamp 44 is, for example, a threaded bolt screwed into a threaded hole in the bottom portion of "U" shaped slide 42 extending between the two parallel leg portions. The position of slide 42 is adjusted along the longitudinal dimension of outer sleeve 28 by aligning the threaded hole in the bottom portion of "U" shaped slide 42 with a corresponding hole or depression in outer sleeve 28 and turning threaded clamp 44 into the threaded hole in the bottom portion of "U" shaped slide 42 and simultaneously into the corresponding hole or depression in outer sleeve 28. The parallel legs of "U" shaped slide 42 are longer than the thickness of outer sleeve 28 and extend beyond that side of outer sleeve 28 opposite clamp 44. A second pivot mechanism 46 is included at the open end of the "U" section extending away from the body of telescoping arm 24 where support strut 48 is secured in axial relationship with telescoping arm 24.

Support strut 48 extends between slide 42 and a third pivot mechanism 50 fixed to one surface of second frame bracket 20. Third pivot mechanism 50 projects away from the vehicle frame. Third pivot mechanism 50 is, according to one embodiment of the invention, formed integrally with second frame bracket 20. Third pivot mechanism 50 suspends, or anchors, one end of strut 48 for rotational motion relative to second frame bracket 20 and, consequently, to the frame of the vehicle. The end of strut 48 opposite second frame bracket 20 is suspended, or anchored, by second pivot mechanism 46 on slide 42. Thus, strut 48 provides columnar support to restrict telescoping arm from rotating upwardly toward the underside of the vehicle when a load is secured to the vehicle by a tension member coupled to tie down 10 at mounting mechanism 40 on foot 38. The suspension provided by both second pivot mechanism 46 and third pivot mechanism 50 allows strut 48 to rotate relative to each pivot mechanism 46, 50 when the position of slide 42 is adjusted relative to telescoping arm 24. According to one embodiment of the invention, strut 48 is a configured as a telescoping strut having an outer sleeve and an inner arm adjustable in axial relationship to one another. Telescoping strut 48 is configured generally consistently with telescoping arm 24 described above, including a mechanism for fixing the inner arm in a desired relative axial position with the outer sleeve.

FIG. 4 illustrates the spaced apart, mutually perpendicular relationship of first and second frame brackets 12 and 20 as installed on the vertical and horizontal portions of the vehicle frame, respectively. As described above, first and second frame brackets 12 and 20 are secured to the vertical and horizontal portions of the vehicle frame, respectively, using fasteners threaded through pre-existing mounting holes on the vehicle frame provided by the original manufacturer such that no drilling of the vehicle frame is needed for installation. FIG. 4 also illustrates in phantom retractable frame mounted tie down 10 in a retracted configuration, whereby tie down 10 is retracted entirely beneath the vehicle body such that it does not interfere with use of the vehicle when the load is not present. Telescoping strut 48 in a collapsed configuration (not shown) draws tie down 10 into a yet more compact form in a closer relationship with the vehicle undercarriage.

FIG. 4 illustrates, in solid lines, tie down 10 in an extended configuration securing a load, for example a camper, on the vehicle. According to one preferred embodiment, a shock absorber 52 is rotatably suspended from universal mounting mechanism 40 of foot 38 of inner arm 30 (best shown in FIG. 5). An adjustable tension member 54 is pliantly suspended from a universal connector portion 56 of shock absorber 52. Adjustable tension member 54 typically includes a suitable tensile device 58 and a tensioning device 60 used in adjusting tension member 54. Tensile device 58 is, for example, a chain (shown), cable, rod, braided wire or other suitable tensile device and tensioning device 60 is, for example, a turn-buckle or other suitable device for tightening tension member 54 to a desired degree. Shock absorber 52 relieves the stress on tie downs 10, bolts 16, and the vehicle frame when, for example, travel across uneven terrain tends to induce shock and/or vibration loads on tie downs 10 due to rocking of the load or other relative movement between the load and the vehicle. Thus, shock absorber 52 protects tie downs 10 the vehicle frame and camper anchors from shock and vibration induced damage in contrast to the more rigid prior art devices.

Figure 5:
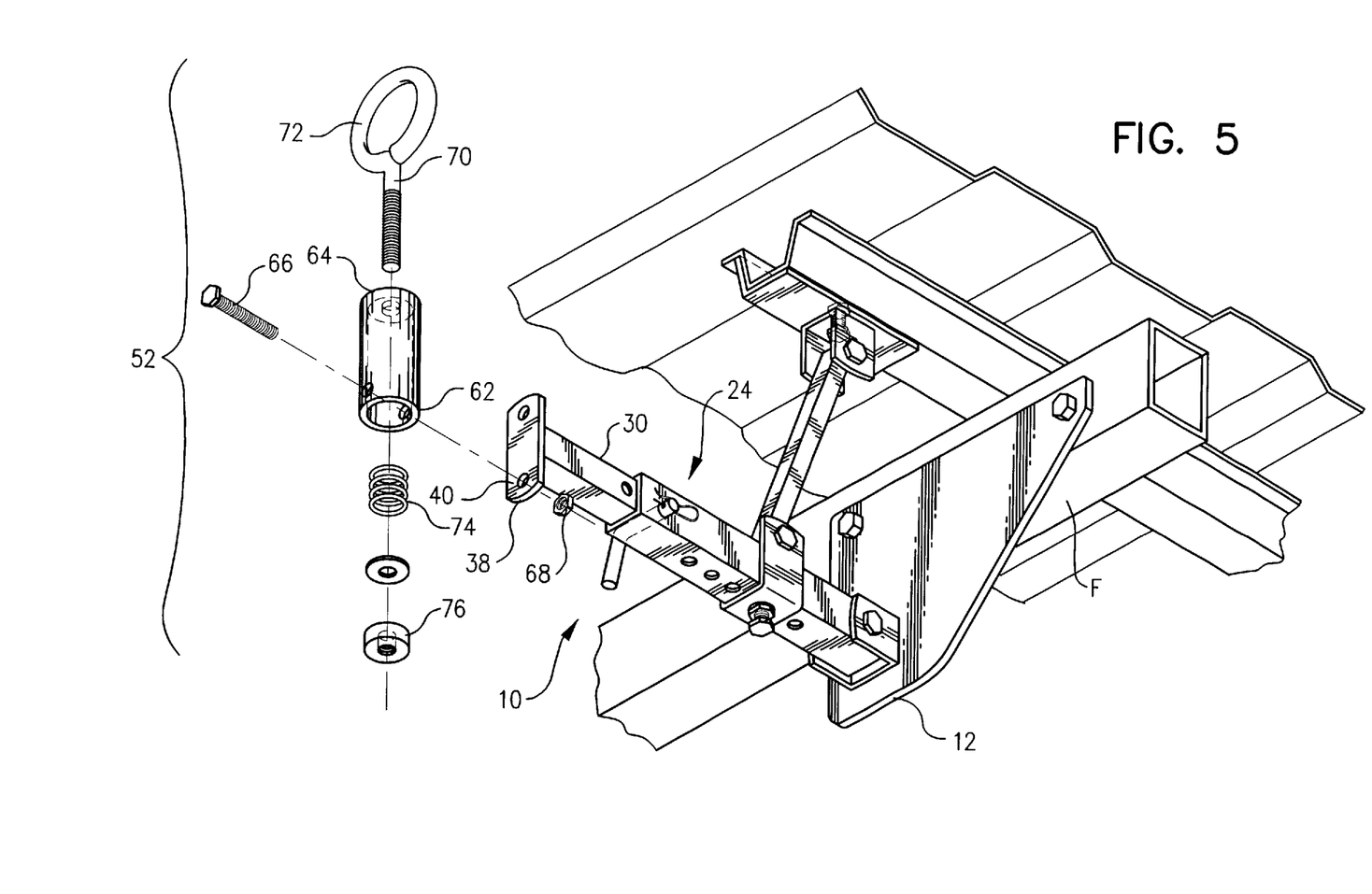
FIG. 5 shows an exploded view of one exemplary embodiment of the shock absorber portion of the present invention and its rotatable suspension from a universal mounting mechanism on the retractable frame mounted tie downs of the invention, whereby the tie downs and the vehicle frame are protected from shock and vibration induced damage in contrast to the more rigid prior art devices.

FIG. 5 shows an exploded view of one exemplary embodiment of shock absorber 52 and its rotatable suspension from universal mounting mechanism 40 of foot 38 of inner arm 30. According to the embodiment illustrated in FIG. 5, shock absorber 52 includes a tubular sleeve 62 rotatably mounted to inner arm 30 at foot 38 by a pivot mechanism, for example, a bolt 66 and nut 68 (shown), a clevis pin, or another suitable mechanism whereby shock absorber 52 is rotatably secured to inner arm 30. Sleeve 62 includes a cap 64 (shown in phantom) formed at one end opposite the pivotal connection to inner arm 30. A hanger 70 extends through end cap 64 and includes a universal connector end 72 for rotatably suspending tension member 54 (shown in FIG. 4) securing a load to the vehicle. The end of hanger 70 opposite universal connector 72 extends into sleeve 62 and is configured to compress a cushion 74, for example a spring (shown) or other suitable cushion device between end cap 64 and a fastener 76 secured to the end of hanger 70. Cushion 74 performs the shock and vibration absorbing function of shock absorber 52 by maintaining a predetermined tensile force on tension member 54 while providing sufficient clearance between end cap 64 of sleeve 62 and fastener 76 when subjected to momentary severe tensile loads.

Those of ordinary skill in the art will readily recognize that the embodiment of shock absorber 52 illustrated in the various figures of the drawing and described herein is not intended to limit the scope of the invention and that other configures of the various components are within the skill of one of ordinary skill to design. For example, in FIG. 5, hanger 70 is shown as an eyebolt, but the invention contemplates other hanger configurations adapted to rotatably suspend tension member 54 at one end and adapted to accept a fastener at the other end. For example, universal connector end 72 of hanger 70 is alternatively configured as an open hook while the threads on the opposing end are alternatively replaced by a smooth shaft pierced by a number of holes for inserting pins at various positions along the shaft's longitudinal dimension whereby cushion 74 is pre-compressed to a greater or lesser degree. In another example, the passage in end cap 64 through which the shaft of hanger 70 passes is alternatively threaded whereby fastener 76, for example a lock nut, is fixed relative to the end of hanger 70 and cushion 74 is pre-compressed to a greater or lesser degree by turning the threaded shaft of eyebolt hanger 70 which increases or decreases the dimension between end cap 64 and lock nut fastener 76. In yet another example, tubular sleeve 62 is alternatively shaped with a square or rectangular cross-section. According to another alternative embodiment, tubular sleeve is replaced by a "U" shaped member wherein the structure of end cap 64 is provided by the portion extending between the two parallel legs of the "U" shaped structure and shock absorber 52 is rotatably mounted to inner arm 30 at foot 38 by a pivot mechanism extending through the ends of the two parallel legs opposite end cap 64.

According to the exemplary embodiment illustrated in FIG. 5, first and second frame brackets 12 and 20 are configured to adapt to the frame of an embodiment of a 1999 model pick-up truck manufactured by the Ford Motor Company and to mate with pre-existing mounting holes formed in the vehicle vertical and horizontal frame portions, respectively.

Figure 6:
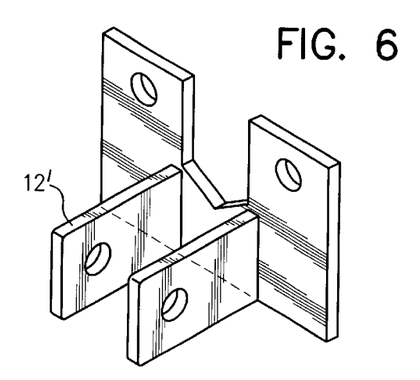
FIG. 6 illustrates one embodiment of a frame bracket portion of the retractable frame mounted tie downs of the invention adapted to mate with pre-existing mounting holes in the frame of one configuration of vehicle available from one manufacturer, other embodiments of the frame bracket portions of the invention (not shown) are similarly adapted to mate with pre-existing mounts available on the frame and undercarriage of other vehicles available from other manufacturers.
Figure 7:
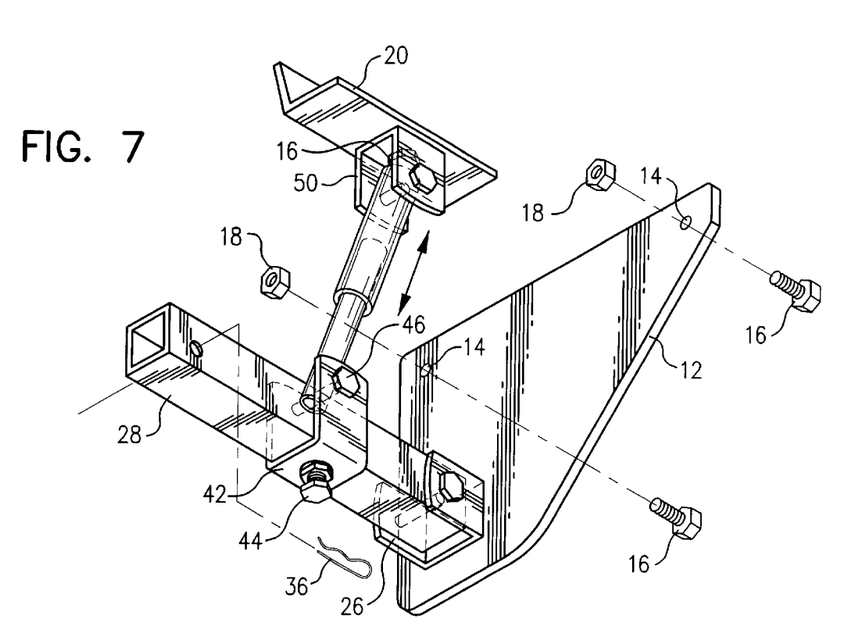
FIG. 7 is an exploded view of the retractable frame mounted tie downs of the invention.

FIG. 6 illustrates one embodiment of a first frame bracket 12' adapted to mate with pre-existing holes in the frame of one configuration of a 1999 Dodge pick-up truck. Other embodiments of first and second frame brackets 12 and 20 of the invention are similarly adapted to mate with pre-existing mounts available on the frame and undercarriage of other vehicles available from other manufacturers. Thus, according to preferred embodiments of the invention, each embodiment is configured to mate with pre-existing mounting holes of a different vehicle frame without need for drilling holes or otherwise modifying the vehicle frame. Because no frame modifications are required for installation, the drill-less retractable frame mounted tie downs of the present invention require neither special tools nor expertise for installation. Nor does the installation of the drill-less retractable frame mounted tie downs of the present invention violate or void the warranties provided by many vehicle manufacturers by the addition of such holes in the vehicle frame.

Those of ordinary skill in the relevant art recognize that, although the foregoing invention has been described in detail for purposes of clarity, the present invention is not limited to the drill-less retractable frame mounted tie downs described above and shown in the figures of the drawing. For example, the square cross-section members of telescoping arm 24 may be, for example, tubular in cross-section while inner arm 30 may be a solid rod rather than a tube. However, the extruded square cross-section is generally preferred for telescoping arm 24, because the materials are relatively sturdy and commonly available. In another example, the pin-through-flange mechanism of first hinges alternatively replace second and third pivot mechanisms 26, 46, 50 illustrated in the drawing figures. The pin-through-flange configuration is generally preferred for each of first, second and third pivot mechanisms 26, 46, 50, because the well-known design is a simple and relatively foolproof construction while the materials are relatively sturdy and commonly available. Also, one or more of pivot mechanisms 26, 46, 50 can be alternatively replaced by a joint, such that a corresponding portion of tie down 10 in fixed in a generally non-rotatable cantilever relationship with the vehicle frame. However, rotatable joints are preferred to provide maximum flexibility during installation and subsequent use. In yet another example, a fixed length arm that is not retractable replaces telescoping arm 24 when the tie down is not in use. However, the retractable telescoping arm is preferred such that the tie down can be secreted under the vehicle where it does not interfere with normal use of the vehicle. Thus, it will be obvious to those of ordinary skill in the relevant art that certain modifications may be practiced within the scope of the appended claims.

I claim:

1. A tie down for securing an object to a pre-existing mounting structure on a motor vehicle frame, said tie down comprising:

a first frame bracket, and a second frame bracket, said first and said second frame brackets each adapted to mate with pre-existing mounting structure on a motor vehicle frame;

an extensible telescoping load bearing arm, said load bearing arm projecting from said first frame bracket, said load bearing arm having a distal end, said distal end adapted for mounting of an accessory; and a support strut extending between said load bearing arm and said second frame bracket, said support strut having a lower end adjustably locatable along said load bearing arm, said support strut positionable to a pre-selected orientation between said first and said second frame brackets, and wherein said pre-selected orientation for said first and said second frame brackets provides a spaced apart, mutually perpendicular relationship therebetween; and wherein said tie-down structure avoids penetration of said object being secured.

2. The tie down as set forth in claim 1, further comprising an adjustable tension member, said adjustable tension member mounted between said object and said distal end of said load bearing arm.

3. The tie down as set forth in claim 2, further comprising a shock absorber, said shock absorber mounted between said distal end of said load bearing arm and said adjustable tension member.

4. The tie down as set forth in claim 3, wherein said shock absorber comprises:
   a housing sleeve adjustably mounted to said distal end of said load bearing arm, said sleeve having an upper end with a cap portion;
   an upwardly extending hanger, said hanger having first and second ends positioned on opposing sides of said cap;
   a compressible spring, said compressible spring located between said second end of said hanger and said cap;
   so that said spring is compressed when tension force is applied to said first end of said hanger.

5. The tie down as set forth in claim 4, wherein said housing sleeve is pivotally mounted to said distal end of said load bearing arm.

6. The tie down as set forth in claim 1, further comprising an adjustably positionable slide having a clamp, said adjustably positionable slide located between said support strut and said load bearing arm and said clamp adapted to secure said slide, and thus said support strut, to said load bearing arm at a pre-selected adjustable position along said load bearing arm.

7. The tie down as set forth in claim 1, wherein each of said first and second frame brackets includes one or more apertures therethrough adapted to mate with a pre-existing mounting structure on a vehicle frame.

8. The tie down as recited in claim 1, wherein said telescoping arm is rotatably suspended from said second mounting bracket.

9. The tie down as recited in claim 1, wherein said telescoping arm further comprises at least one outer sleeve and an inner arm nested in said at least one outer sleeve, said at least one outer sleeve and said inner arm adapted form moving with respect each to the other along a common longitudinal axis.

10. The tie down as recited in claim 9, further comprising a slide adapted for axial motion along said telescoping arm, said slide including a clamp securing said slide at a variable position relative to said telescoping arm, and
   wherein a first end of said support strut is pivotally secured to said clamp and a second end of said support strut opposite said first end is pivotally suspended from said second frame bracket.

11. The tie down recited in claim 10, wherein said support strut comprises a telescoping support strut, said telescoping support strut including an inner arm fixable in axial relationship with an outer sleeve of said telescoping support strut.

12. The tie down recited in claim 9, further comprising a universal mounting mechanism fixed at said distal end of said telescoping arm, whereby an accessory is rotatably mounted on said telescoping arm.

13. The tie down recited in claim 12, further comprising a shock absorber rotatably suspended from said universal mounting mechanism.

14. The tie down recited in claim 13, wherein said shock absorber comprises:
   a sleeve rotatably suspended from said universal mounting mechanism, said sleeve comprising a cap formed at a first end;
   a hanger extending through said cap, said hanger having first and second ends positioned on opposing sides of said cap;
   a universal connector formed at said first end of said hanger, said universal connector adapted for rotatably mounting an accessory; and
   a compressible cushion located between said cap and said second end of said hanger.

15. The tie down recited in claim 14, wherein said compressible cushion is adjustably compressed between said cap and said second end of said hanger.

16. The tie down recited in claim 15, further comprising an adjustable tension member, said adjustable tension member rotatably mounted to said universal connector formed at said first end of said hanger.

17. A retractable tie down for mounting to pre-existing mounting structure on a vehicle frame, the tie down comprising:
   first and second spaced apart, mutually perpendicular frame brackets, each said frame bracket adapted to mate with pre-existing mounting structure on a vehicle frame;
   a telescoping arm rotatably suspended from said first mounting bracket, said telescoping arm including an inner arm slidably nested in an outer sleeve and a releasable inner arm fastener adjustably fixing said inner arm in axial relationship with said outer sleeve; and
   a support strut rotatably suspended between said outer sleeve portion of said telescoping arm and said second frame bracket.

18. The tie down recited in claim 17, wherein one end of said telescoping arm is rotatably suspended from said first mounting bracket; and
   further comprising a universal mounting mechanism fixed at a second end of said telescoping arm opposite said rotatably suspended end, whereby an accessory is rotatably mounted on said telescoping arm.

19. The tie down recited in claim 17, wherein each said first and second frame brackets includes one or more through holes adapted to mate with pre-existing mounting structure on a vehicle frame.

20. The tie down recited in claim 17, further comprising a slide adapted for axial motion relative to said outer sleeve of said telescoping arm, said slide including a fastener securing said slide at a variable position relative to said outer sleeve; and
   wherein said support strut is rotatably suspended from said slide in variable axial relationship with said outer sleeve of said telescoping arm.

21. The tie down recited in claim 20, wherein said support strut comprises a telescoping support strut, said telescoping support strut including an inner arm fixable in axial relationship with an outer sleeve of said telescoping support strut.

22. A retractable tie down for mounting to pre-existing mounting holes on a vehicle frame, the tie down comprising:
   first and second spaced apart, mutually perpendicular frame brackets, each said frame bracket adapted for mating with pre-existing mounting holes on a vehicle frame;
   a telescoping arm adapted for rotational motion in a plane essentially perpendicular to a plane defined by said first mounting bracket;
   a first pivot mechanism projecting from a surface of said first frame bracket, said first pivot mechanism rotatably suspending said telescoping arm from said first frame bracket;
   a support strut extending between said telescoping arm and said second frame bracket, said support strut securing said telescoping arm in fixing orientation with each said first and second frame brackets.

23. The retractable tie down recited in claim 22, wherein said telescoping arm further comprises:
- an outer sleeve rotatably suspended by said first pivot mechanism from said first mounting bracket;
- an inner arm nested in said outer sleeve and adapted for axial motion relative to said outer sleeve; and
- a releasable clamp securing said inner arm in fixed axial relationship with said outer sleeve.

24. The retractable tie down recited in claim 23, further comprising:
- a movable slide, said movable slide including a clamp for adjustably securing said slide in fixed axial relationship with said outer sleeve of said telescoping arm, said movable slide including a second pivot mechanism projecting from a surface thereof; and
- wherein said second frame bracket further comprises a third pivot mechanism projecting from a surface thereof; and
- said support strut further comprises a first end rotatably suspended from said second pivot mechanism portion of said movable slide and a second end rotatably suspended from said third pivot mechanism portion of said second frame bracket.

25. The retractable tie down recited in claim 24, wherein said support strut further comprises a telescoping support strut.

26. A tie down for securing an object to a pre-existing mounting structure on a motor vehicle frame, said tie down comprising:
- a first frame bracket, and
- a second frame bracket, said first and said second frame brackets each adapted to mate with pre-existing mounting structure on a motor vehicle frame;
- an extensible, telescoping load bearing arm, said load bearing arm projecting from said first frame bracket, said load bearing arm having a distal end, said distal end adapted for mounting of an accessory, and wherein said telescoping arm is rotatably suspended from said second mounting bracket, and
- a support strut extending between said load bearing arm and said second frame bracket, said support strut adapted to maintain a pre-selected orientation between said first and said second frame brackets.

27. The tie down as recited in claim 26, further comprising a slide adapted for axial motion along said telescoping arm, said slide including a clamp securing said slide at a variable position relative to said telescoping arm, and
- wherein a first end of said support strut is pivotally secured to said clamp and a second end of said support strut opposite said first end is pivotally suspended from said second frame bracket.

28. The tie down recited in claim 27, wherein said support strut comprises a telescoping support strut, said telescoping support strut including an inner arm fixable in axial relationship with an outer sleeve of said telescoping support strut.

* * * * *